United States Patent
Yang et al.

(10) Patent No.: US 11,510,085 B2
(45) Date of Patent: Nov. 22, 2022

(54) CHANNEL STATE INFORMATION CONFIGURATION AND REPORTING FOR ULTRA RELIABLE LOW LATENCY COMMUNICATION

(71) Applicant: QUALCOMM Incorporated, San Diego, CA (US)

(72) Inventors: Wei Yang, San Diego, CA (US); Seyedkianoush Hosseini, San Diego, CA (US); Seyed Ali Akbar Fakoorian, San Diego, CA (US); Wanshi Chen, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 17/072,932

(22) Filed: Oct. 16, 2020

(65) Prior Publication Data

US 2021/0120575 A1     Apr. 22, 2021

Related U.S. Application Data

(60) Provisional application No. 62/923,408, filed on Oct. 18, 2019.

(51) Int. Cl.
*H04B 7/022*     (2017.01)
*H04B 7/06*      (2006.01)
(Continued)

(52) U.S. Cl.
CPC ............ *H04W 24/10* (2013.01); *H04B 7/022* (2013.01); *H04B 7/0626* (2013.01);
(Continued)

(58) Field of Classification Search
CPC ... H04B 7/02–12; H04B 17/0082–3913; H04J 11/0023–0093;
(Continued)

(56) References Cited

U.S. PATENT DOCUMENTS

2018/0324797 A1   11/2018   Hosseini et al.
2019/0159219 A1    5/2019   Hosseini et al.
(Continued)

FOREIGN PATENT DOCUMENTS

WO   2018021881 A1   2/2018
WO   2019160361 A1   8/2019

OTHER PUBLICATIONS

Ericsson: "Indication of URLLC Configuration", 3GPP Draft, 3GPP TSG-RAN WG1 Meeting #93, R1-1806017, Indication of URLLC Configuration, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 20, 2018 (May 20, 2018), XP051441235, 5 Pages, Retrieved from the Internet: URL: http://www.3gpp.org/ftp/Meetings%5F3GPP%5FSYNC/RAN1/Docs/. [retrieved on May 20, 2018] p. 2, p. 1-p. 4.
(Continued)

*Primary Examiner* — Timothy J Weidner
(74) *Attorney, Agent, or Firm* — Patterson+ Sheridan, L.L.P.

(57) ABSTRACT

The present disclosure provides techniques configuring channel state information (CSI) reporting for certain service types, such as the ultra-reliable low latency communications (URLLC) service type. In some cases, a UE may obtain information regarding a first set of channel state information (CSI) reporting configurations for a first service type separate from a second set of CSI reporting configurations for a second service type, receive a first downlink control infor-
(Continued)

mation (DCI) scheduling a CSI report for the first service type on at least one physical uplink shared channel (PUSCH), generate at least one CSI report for the first service type based on one of the first set of CSI reporting configurations selected based on a field in the DCI, and transmitting the CSI report for the first service type on the PUSCH.

28 Claims, 8 Drawing Sheets

(51) Int. Cl.
      *H04B 17/24* (2015.01)
      *H04B 17/309* (2015.01)
      *H04J 11/00* (2006.01)
      *H04L 5/00* (2006.01)
      *H04W 24/08* (2009.01)
      *H04W 24/10* (2009.01)
      *H04W 48/02* (2009.01)
      *H04W 48/18* (2009.01)
      *H04W 72/04* (2009.01)
      *H04W 72/12* (2009.01)
      *H04W 84/02* (2009.01)
      *H04W 88/02* (2009.01)
      *H04W 88/08* (2009.01)
      *H04W 92/02* (2009.01)
      *H04W 92/10* (2009.01)

(52) U.S. Cl.
    CPC ......... *H04B 7/0632* (2013.01); *H04B 7/0639* (2013.01); *H04B 17/24* (2015.01); *H04B 17/309* (2015.01); *H04J 11/0079* (2013.01); *H04J 11/0093* (2013.01); *H04L 5/0057* (2013.01); *H04L 5/0076* (2013.01); *H04W 24/08* (2013.01); *H04W 48/02* (2013.01); *H04W 48/18* (2013.01); *H04W 72/042* (2013.01); *H04W 72/1289* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
    CPC ............ H04L 5/0001–0098; H04W 8/22–245; H04W 24/02–10; H04W 36/0005–385; H04W 48/02–20; H04W 56/0005–0025; H04W 72/005–14; H04W 74/002–008; H04W 84/02–16; H04W 88/02–12; H04W 92/02; H04W 92/04; H04W 92/10
    See application file for complete search history.

(56) References Cited

U.S. PATENT DOCUMENTS

2020/0196343 A1* 6/2020 Marinier ............ H04W 72/1289
2020/0322971 A1* 10/2020 Jung ................ H04W 72/1289
2020/0374911 A1* 11/2020 Lee .................. H04W 72/1289

OTHER PUBLICATIONS

International Search Report and Written Opinion—PCT/US2020/056200—ISA/EPO—dated Feb. 11, 2021.
OPPO: "Enhancements on Multi-TRP and Multi-Panel Transmission", 3GPP Draft, 3GPP TSG RAN WG1 Meeting #98, R1-1908351, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 17, 2019 (Aug. 17, 2019), XP051764960, 13 Pages, Retrieved from the Internet: URL: http://www.3gpp.org/ftp/tsg_ran/WG1_RL1/TSGR1_98/Docs/R1-1988351.zip, [retrieved on 2819-88-17] pp. 57.

* cited by examiner

CHANNEL STATE INFORMATION CONFIGURATION AND REPORTING FOR ULTRA RELIABLE LOW LATENCY COMMUNICATION

CROSS-REFERENCE TO RELATED APPLICATION(S)

This application claims benefit of and priority to U.S. Provisional Patent Application Ser. No. 62/923,408, filed on Oct. 18, 2019, herein incorporated by reference in its entirety as if fully set forth below and for all applicable purposes.

INTRODUCTION

Aspects of the present disclosure relate to wireless communications, and more particularly, to techniques for configuring channel state information (CSI) reporting for certain service types, such as the ultra-reliable low latency communications (URLLC) service type.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between wireless communication devices.

Certain aspects provide a method for wireless communications by a user equipment. The method generally includes obtaining information regarding a first set of channel state information (CSI) reporting configurations for a first service type separate from a second set of CSI reporting configurations for a second service type, receiving a first downlink control information (DCI) scheduling a CSI report for the first service type on at least one physical uplink shared channel (PUSCH), generating at least one CSI report for the first service type based on one of the first set of CSI reporting configurations selected based on a field in the DCI, and transmitting the CSI report for the first service type on the PUSCH.

Certain aspects provide a method for wireless communications by a base station. The method generally includes configuring a user equipment (UE) with information regarding a first set of channel state information (CSI) reporting configurations for a first service type separate from a second set of CSI reporting configurations for a second service type, sending the UE a first downlink control information (DCI) scheduling a CSI report for the first service type on at least one physical uplink shared channel (PUSCH), and receiving, from the UE, at least one CSI report for the first service type based on one of the first set of CSI reporting configurations selected based on a field in the DCI.

Aspects of the present disclosure provide means for, apparatus, processors, and computer-readable mediums for performing the methods described herein.

Aspects of the present disclosure provide means for, apparatus, processors, and computer-readable mediums for performing techniques and methods that may be complementary to the operations by one UE described herein, for example, by another UE.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide techniques for configuring channel state information (CSI) reporting for certain service types, such as the ultra-reliable low latency communications (URLLC) service type. The techniques presented herein provide flexibility in configuring and triggering CSI reports that may be tailored to a particular service type. For example, CSI reporting for enhanced mobile broadband (eMBB) may be configured for larger payloads to convey finer granularity information which may help achieve increased throughput. On the other hand, CSI reporting for ultra-reliable low latency communications (URLLC) may be configured for relatively small payloads and reduced processing overhead for generating the reports, as high throughput is not typically a requirement of URLLC.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a sub-band, etc. Each frequency may support a single RAT in a given geographic area in order to avoid interference between wireless networks of different RATs. In some cases, a 5G NR RAT network may be deployed.

Figure 1:
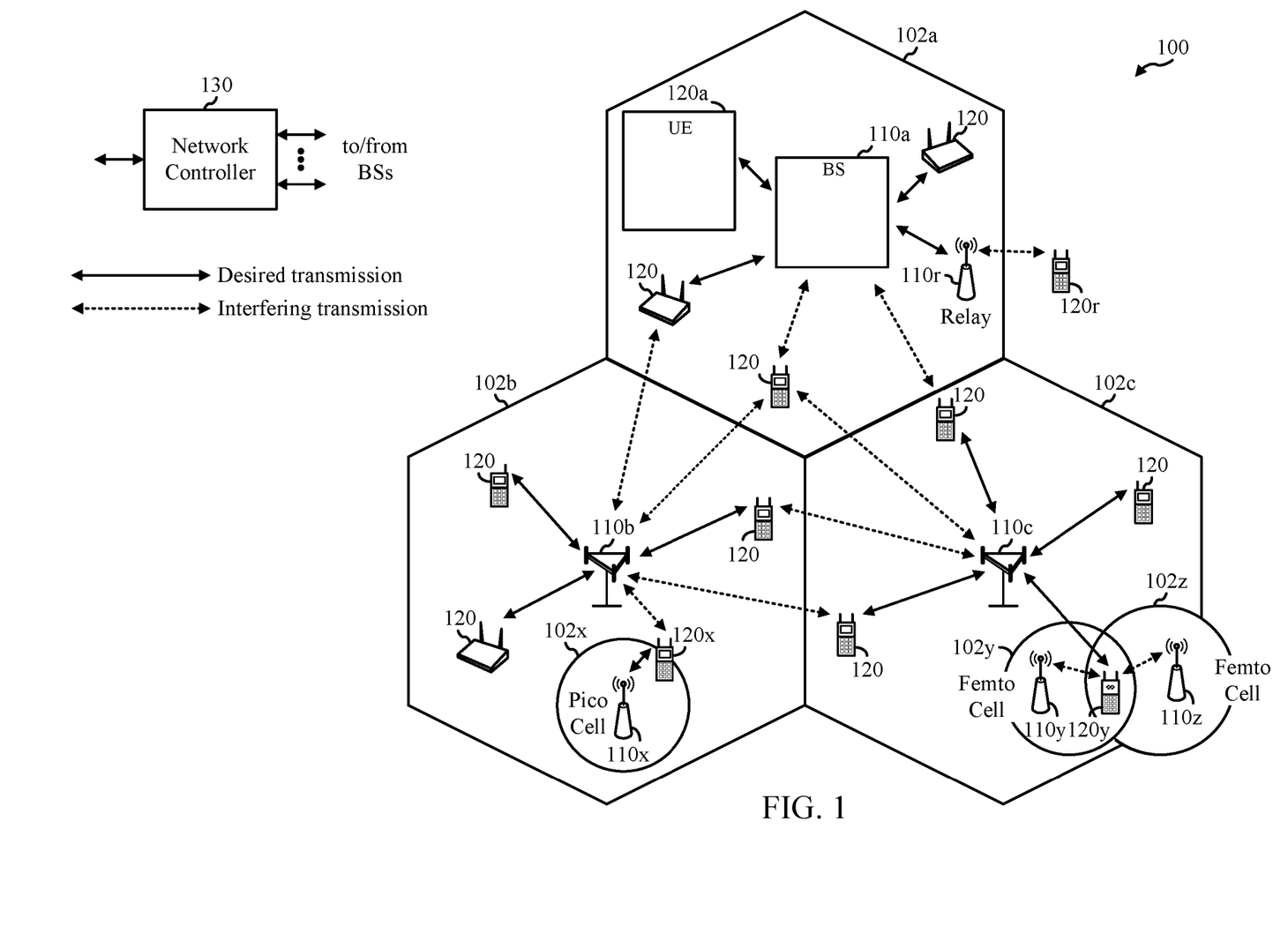
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, UEs 120 in the network 100 may be configured to perform operations 400 of FIG. 4 to generate CSI reports in accordance based on service-type specific reporting configurations. Similarly, base stations 110 (e.g., gNBs) in the network 100 may be configured to perform operations 500 of FIG. 5 to configure UEs 120 to generate CSI reports in accordance based on service-type specific reporting configurations.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 20x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
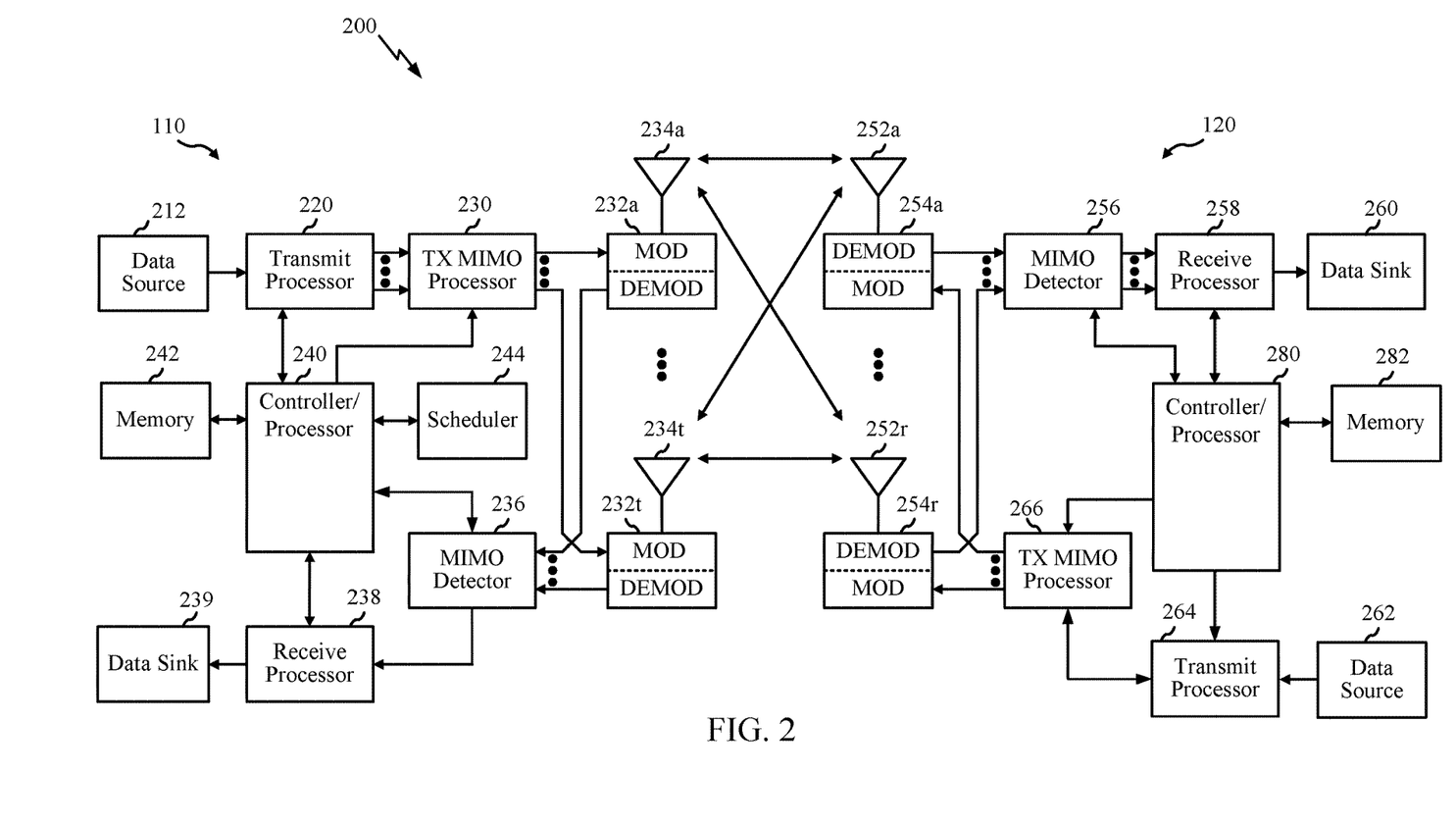
FIG. 2 is a block diagram conceptually illustrating a design of an example a base station (BS) and user equipment (UE), in accordance with certain aspects of the present disclosure.

FIG. 2 illustrates example components of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 may be configured to perform operations 400 of FIG. 4. Similarly, antennas 234, processors 220, 230, 238, and/or controller/processor 240 of the BS 110 may be configured to perform operations 500 of FIG. 5.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive downlink signals from the BS 110 or a parent IAB-node, or a child IAB-node may receive downlink signals from a parent IAB-node, and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120 or a child IAB-node, a transmit processor 264 may receive and process data (e.g., for the physical uplink shared channel (PUSCH) or the PSSCH) from a data source 262 and control information (e.g., for the physical uplink control channel (PUCCH) or the PSCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110 or a parent IAB-node.

At the BS 110 or a parent IAB-node, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The controller/processor 280 and/or other processors and modules at the UE 120 may perform or direct the execution of processes for the techniques described herein. The memories 242 and 282 may store data and program codes for BS 110 and UE 120, respectively. A scheduler 244 may schedule UEs for data transmission on the downlink and/or uplink.

Figure 3:
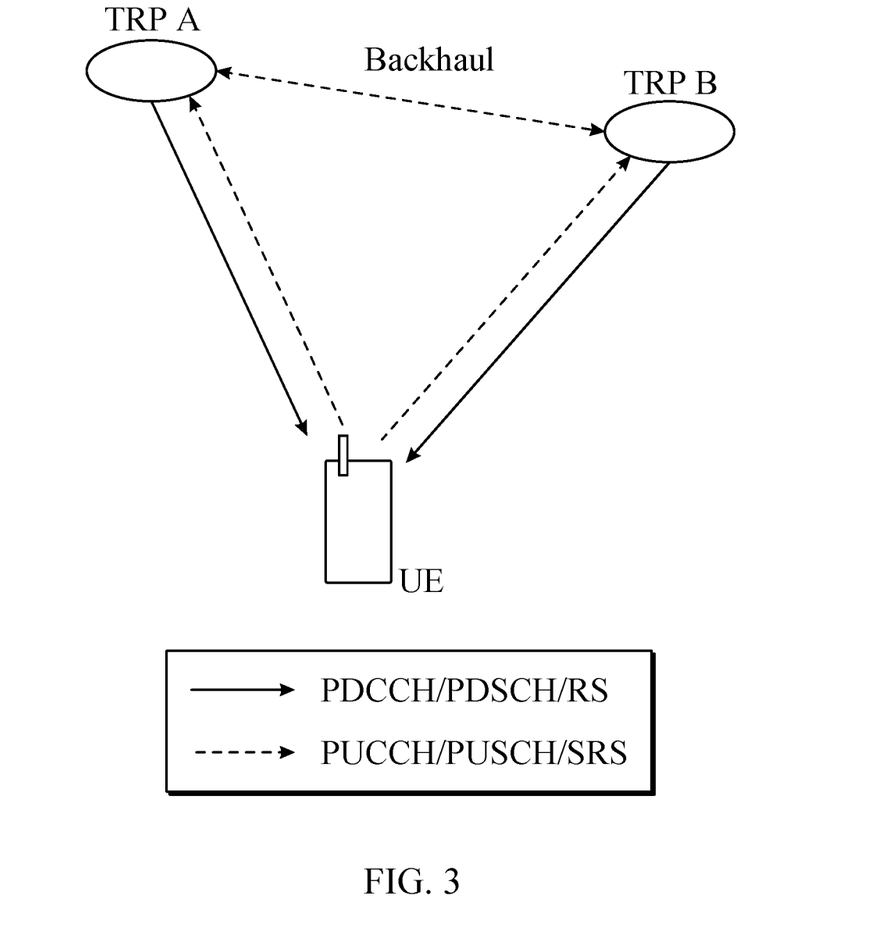
FIG. 3 is a diagram illustrating an example multiple transmission reception point (TRP) transmission scenario, in accordance with certain aspects of the present disclosure.

FIG. 3 is a diagram illustrating an example multi-TRP transmission scenario, in accordance with certain aspects of the present disclosure. In the illustrated example, multiple TRPs (TRP A and TRP B) may communicate with the same UE at the same/different time in a transparent manner either to improve reliability and/or increase throughput. For example, TRP A and TRP B may jointly transmit PDCCH/PDSCH/reference signals (e.g., DMRS) to the same UE. Similarly, on the uplink, the UE may transmit PUCCH/PUSCH/reference signals (e.g., SRS) to the TRPs.

TRP A and TRP B may communicate via a backhaul connection. Ideally, to allow dynamic coordinate between TRPs for the multi-TRP transmission, the backhaul allows communication between TRPs with effectively zero delay and unlimited capacity. Unfortunately, many backhaul connections are not ideal, with limited capacity and substantial delay (e.g., 5 ms delay or even more), which may, prevent dynamic coordination between TRPs. In such cases, coordination between the TRPs may be limited for example, to semi-static coordination.

In multi-TRP scenarios, one downlink control information (DCI) may schedule one or more multiple PDSCH transmissions (from multiple TRPs). The DCI may be transmitted by one or multiple TRPs.

In some cases, multiple DCI may schedule multiple (e.g., 2, 4, or more) PDSCH transmissions. In this case, each DCI may be transmitted by one TRP and schedules the corresponding PDSCH (for that TRP). In this case, it may be assumed that each PDSCH contains one QCL assumption.

Example CSI Configuration and Reporting for URLLC

In New Radio (NR) deployments, a UE may support communications (traffic) with various service types. For example, NR UEs may support enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC).

In some deployments (e.g., NR Rel-16), new DCI formats may be introduced to schedule URLLC traffic. In such cases, to better serve URLLC traffic, a UE may have some specific configurations for CSI reporting for URLLC, which differs from CSI reporting for eMBB. For example, CSI reporting for eMBB may involve larger payloads to convey finer granularity information which may help achieve increased throughput, while CSI reporting for URLLC may involve relatively small payloads, reduced processing overhead for generating the reports, and higher reliability for communicating the reports to the base station.

Aspects of the present disclosure provide techniques that may help address and accommodate differences for CSI reporting configurations between eMBB and URLLC.

The general goal of CSI reporting by a UE is to help ensure that a gNB has current information regarding channel conditions. In some cases, a UE may need to report CSI information as fast as possible to ensure the gNB has the most up-to-date information. To this end, the processing task (and associated latency) at the UE for CSI reporting may need to be reduced for URLLC by configuring different parameters that can be used for URLLC CSI reports (relative to those used for eMBB CSI reports).

There are various CSI reporting parameters that may be set to help reduce the UE processing task and latency. For example, a UE may be configured with certain Codebook subset restrictions, for example, which restricts the beam (e.g., DFT beam) and/or rank that a UE can use for URLLC. For example, for URLLC, a UE may be restricted to rank 1 or 2 (i.e., RI<=2), and with beam restriction. In other words, a UE may only report CSI for rank 1 or 2, as a gNB may only schedule DL transmissions with rank 1 or 2. This scenario may be reasonable given that URLLC service typically will not involve a very large packet size (as compared with eMBB traffic). In such cases, if a precoding matrix indicator (PMI) includes at least one restricted DFT beam, this PMI may be considered as restricted (i.e., not used).

This type of rank restriction may indicates that a UE only reports CSI according to a single part (e.g., a type 1 CSI report) and the second part (CSI part 2) of two-stage reporting may not be needed for URLLC CSI reporting. Further, if a rank restriction is set to 1, there may be no need for the UE to report rank (thus, the UE may only report CRI, PMI and CQI).

In some cases, there may be a restriction on the codebook type used for CSI reporting by a UE based on service type. For example, a UE may use a type 1 Codebook type for URLLC and a type 2 Codebook for eMBB. While a type 2 CSI codebook generally might increase the throughput of DL transmissions, when compared with a type 1 CSI codebook, the computation and feedback overhead for type 2 CSI codebook is substantially higher than that of type 1 CSI codebook.

In some cases, there may be a restriction on a serving cell index for which CSI is reported. For example, since not all downlink (DL) serving cells (and/or bandwidth parts-BWPs) may be configured to support URLLC service. Therefore, a UE may be configured to report URLLC CSI only for the DL serving cells/BWPs that are configured to support URLLC service.

Various other parameters may also be restricted based on service type. For example, sub-band size may be restricted for sub-band based CQI/PMI reports. As another example, different CQI tables with different BLER targets may be used for different service types. For example, CQI tables with lower BLER targets may be used for URLLC to achieve high reliability, while CQI tables with lower BLER targets may be used for eMBB to achieve higher throughput.

The various types of restrictions described above may be applied to various types of CSI reporting, including aperiodic, periodic, and semi-persistent (i.e., A-, P-, and SP) CSI reporting.

A new uplink (UL) DCI format with a CSI request field may be used for scheduling URLLC A-CSI and SP-CSI reporting on PUSCH. Due to the nature of URLLC, an A-CSI/SP-CSI report scheduled on URLLC PUSCH is likely to have higher priority than CSI report carried on an eMBB PUSCH, and can be used to carry CSI report for URLLC.

Aspects of the present disclosure propose using separate lists of CSI triggers states to support the different CSI reporting needs for different service types. For example, as will be described in greater detail below, a UE may be configured with a separate CSI-AperiodicTriggerStateList for URLLC (than for eMBB), where each state triggers a (possibly different) CSI report configuration for URLLC.

Figure 4:
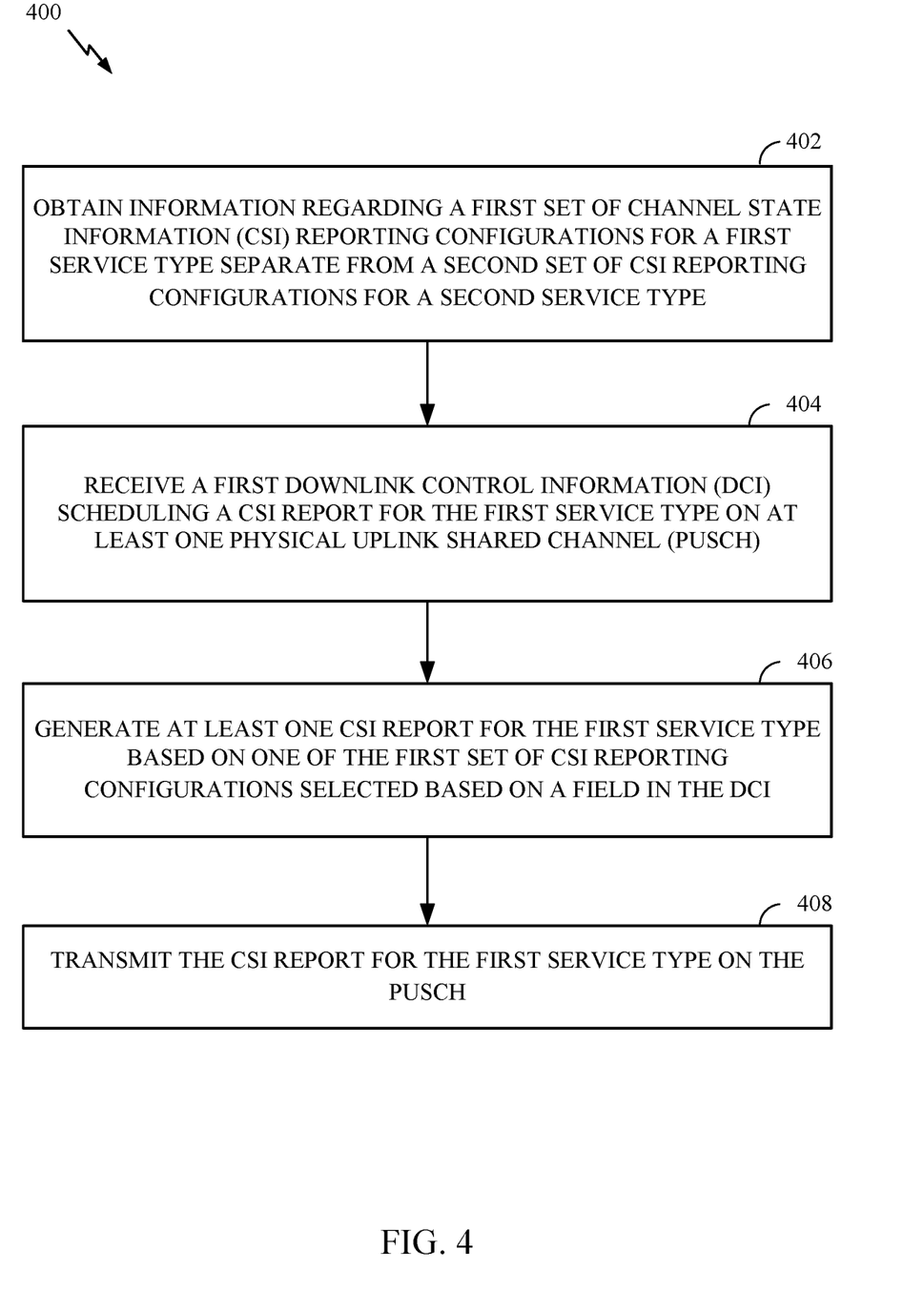
FIG. 4 is a flow diagram illustrating example operations for wireless communication by a user equipment, in accordance with various aspects of the disclosure.

FIG. 4 illustrates example operations 400 for wireless communications by a user equipment (UE), in accordance with aspects of the present disclosure. For example, operations 400 may be performed by a UE 120 shown in FIGS. 1 and 2.

Operations 400 begin at 402, by obtaining information regarding a first set of channel state information (CSI) reporting configurations for a first service type separate from a second set of CSI reporting configurations for a second service type.

In some cases, the first service type has a first priority, the second service type has a second priority, and the first priority and the second priority are different. For example, the first service type may be URLLC with a higher priority than the second service type (e.g., eMBB).

In some cases, the information may include a first CSI trigger state list for the first service type and a second CSI trigger state list for the second service type. For example, the first CSI trigger state list may identify the first set of CSI report configurations, while the second CSI trigger state list identifies the second set of CSI report configurations.

At 404, the UE receives a first downlink control information (DCI) scheduling a CSI report for the first service type on at least one physical uplink shared channel (PUSCH). At 406, the UE generates at least one CSI report for the first service type based on one of the first set of CSI reporting configurations selected based on a field in the DCI. At 408, the UE transmits the CSI report for the first service type on the PUSCH.

In some cases, the first DCI has a first format associated with the first service type and the CSI report is generated from the first set of CSI report configurations, based on the first DCI being the first format. The UE may also receive a second DCI that has a second format associated with the second service type and generate a CSI report from the second set of CSI report configurations, based on the second DCI being of the second format.

Figure 5:
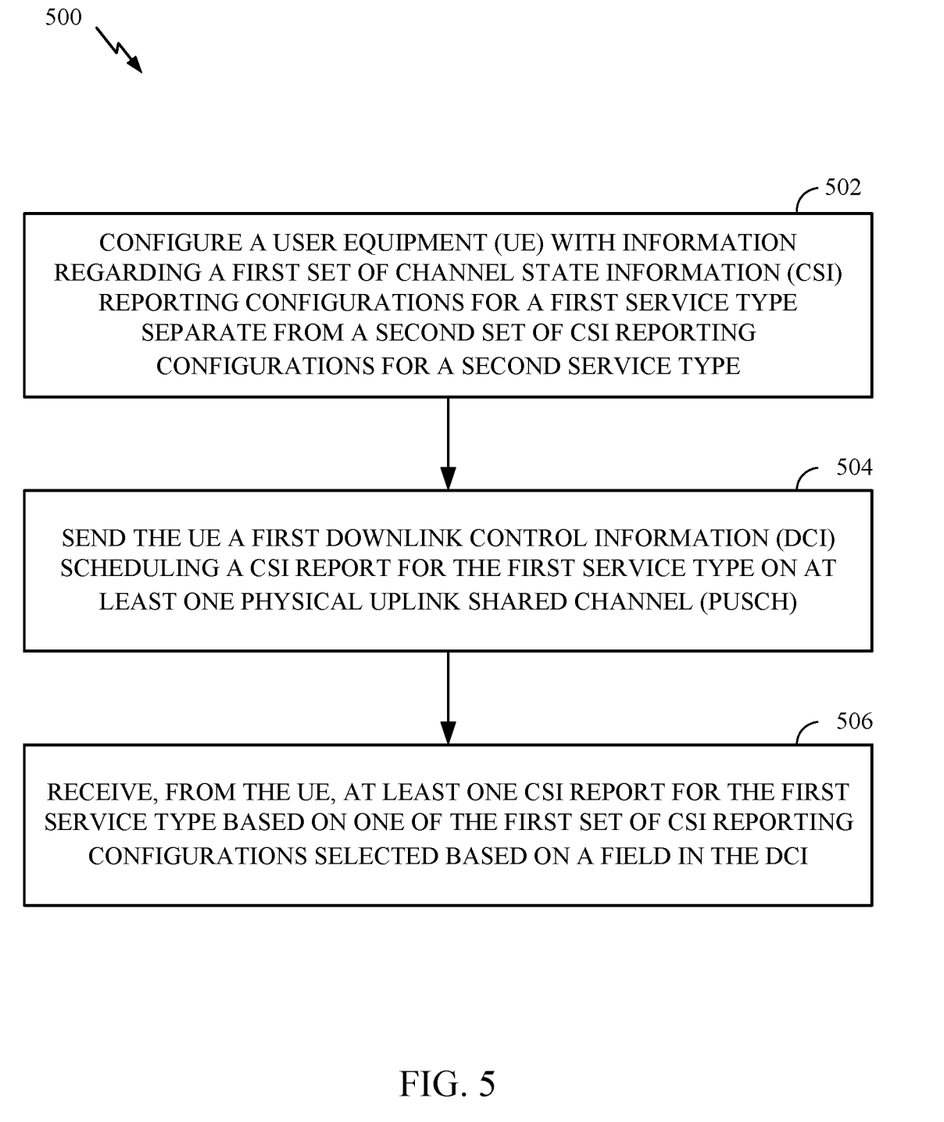
FIG. 5 is a flow diagram illustrating example operations for wireless communication by a base station, in which aspects of the present disclosure may be practiced.

FIG. 5 illustrates example operations 500 for wireless communications by a network entity, in accordance with aspects of the present disclosure. For example, operations 500 may be performed by a BS 110 (e.g., a gNB) shown in FIGS. 1 and 2.

Operations 500 begin at 502, by configuring a user equipment (UE) with information regarding a first set of channel state information (CSI) reporting configurations for a first service type separate from a second set of CSI reporting configurations for a second service type. At 504, the network entity sends the UE a first downlink control information (DCI) scheduling a CSI report for the first service type on at least one physical uplink shared channel (PUSCH). At 506, the network entity receives, from the UE, at least one CSI report for the first service type based on one of the first set of CSI reporting configurations selected based on a field in the DCI.

As noted above, a UE may be configured with different CSI reporting configurations for different service types and the particular configuration chosen may depend on a DCI format and/or value conveyed in the DCI. For example, the CSI request field in a URLLC DCI format may be used to trigger/activate one of the configured URLLC CSI report configurations. For example, the CSI request field may trigger one CSI report transmission for A-CSI reporting on URLLC PUSCH or activate (a sequence of) CSI report transmissions for SP-CSI reporting on URLLC PUSCH.

Figure 6:
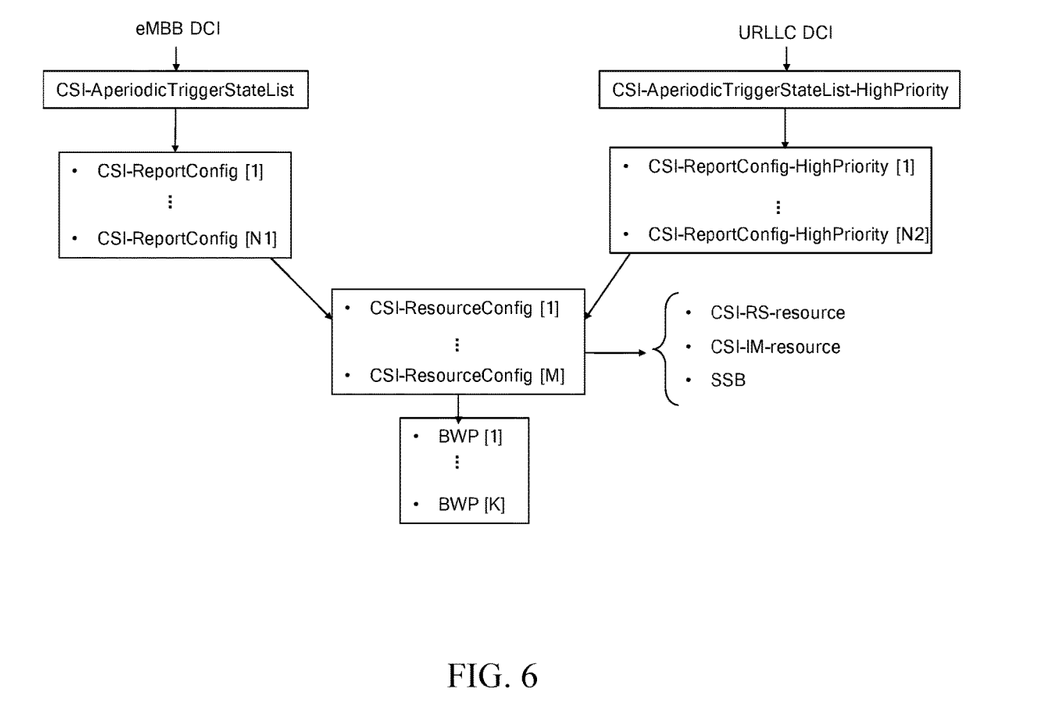
FIGS. 6 & 7 illustrate example CSI reporting configurations for different service types, in accordance with various aspects of the disclosure.
Figure 7:
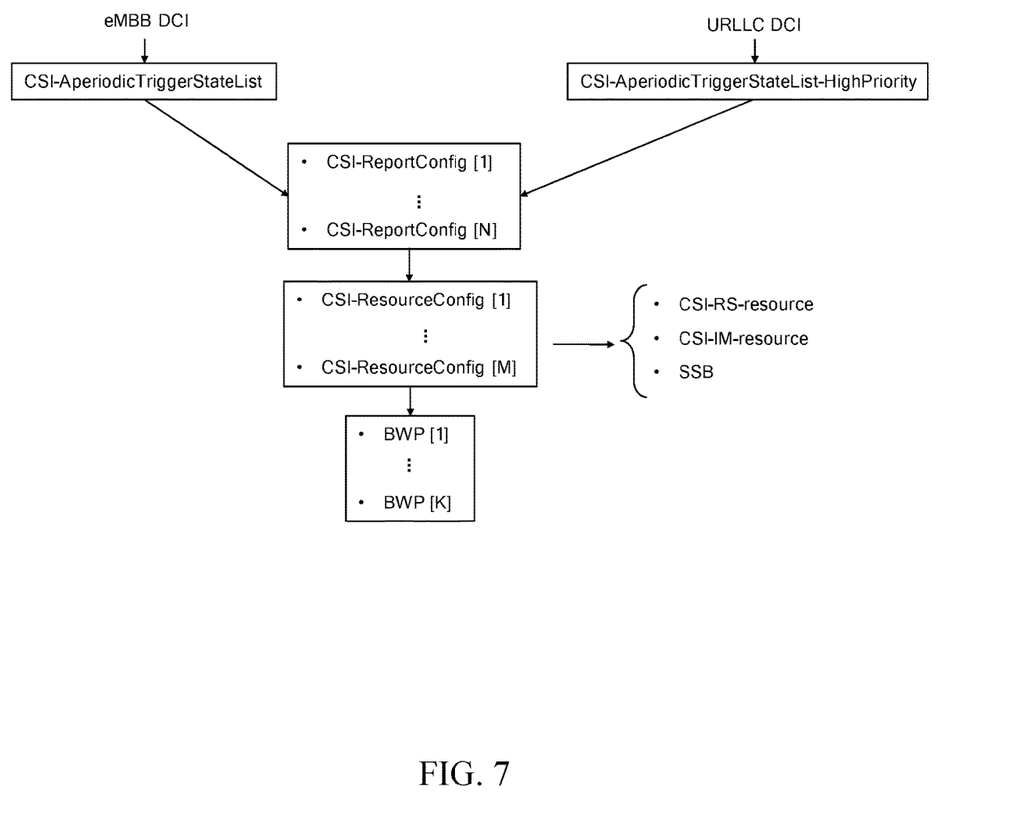

FIGS. 6 & 7 illustrate examples of how to implement CSI reporting configurations for different service types, in accordance with various aspects of the disclosure. The different CSI reporting configurations may have different parameters, for example, to implement the various types of restrictions discussed above with respect to URLLC CSI reporting.

As illustrated in FIG. 6, a UE may be configured with a first set of CSI reporting configurations for eMBB and a second set of CSI reporting configurations for URLLC. In some cases, the UE may receive (via RRC signaling) a CSI-AperiodicTriggerStateList that identifies the eMBB CSI reporting configurations and a CSI-AperiodicTriggerStateList that identifies the URLLC CSI reporting configurations (which may be given higher priority).

Each CSI reporting configuration may be associated with one or more (e.g., up to 3) of M CSI resource configurations. Each CSI reporting configuration may indicate one or more of a CSI-RS resource, a CSI interference management (IM) resource, or a synchronization signal block (SSB). Each CSI-RS resource may be associated with one or more (of k) BWPs.

As illustrated, a first number (N1) of the eMBB CSI reporting configurations may be selected, while a second number (N2) of the URLLC CSI reporting configurations may be selected. An eMBB DCI received by the UE may trigger an eMBB CSI report according to one of the N1 eMBB CSI reporting configurations. Similarly, a URLLC DCI (with a CSI request field) may trigger a URLLC CSI report according to one of the N2 URLLC CSI reporting configurations.

As illustrated in FIG. 6, the set of URLLC CSI reporting configurations and the set of eMBB CSI reporting configurations may be selected from different sets of CSI reporting configurations. As an alternative, as shown in FIG. 7, the set of eMBB CSI reporting configurations may be selected from a common set of CSI reporting configurations.

In some cases, the concept of separate CSI reporting configurations may be extended beyond different service types. For example, while the examples shown in FIGS. 6 and 7 illustrate separate CSI report configurations for URLLC and eMBB, separate CSI reporting configurations may also be provided for different transmitter receiver points (TRPs).

Figure 8:
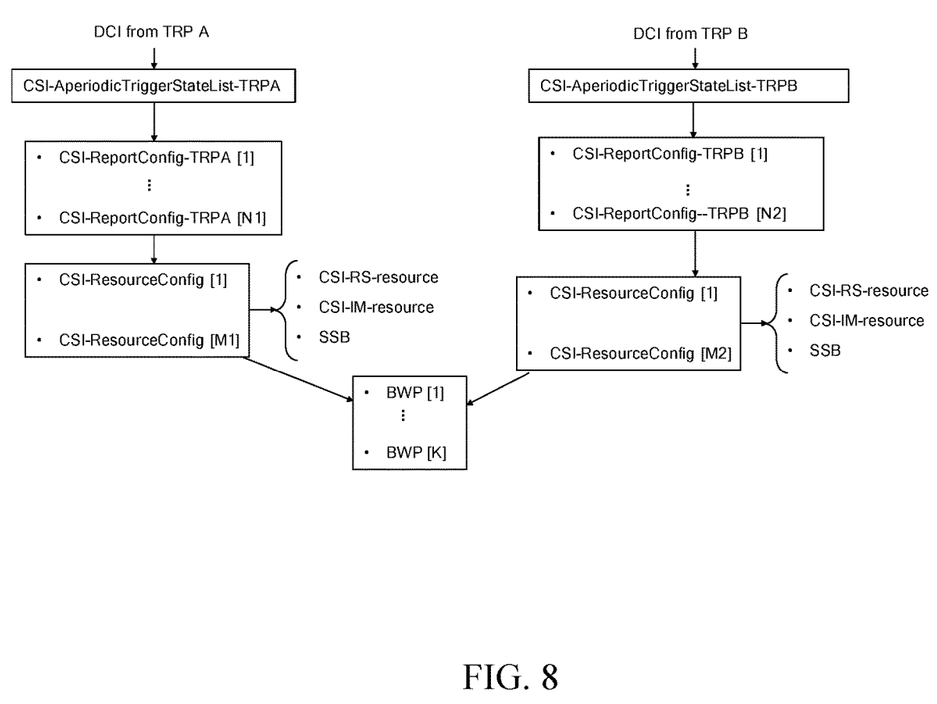
FIG. 8 illustrates example CSI reporting configurations for different transmitter receiver points (TRPs), in accordance with various aspects of the disclosure.

FIG. 8 illustrate example CSI reporting configurations for a UE communicating with different transmitter receiver points (TRPs), in accordance with various aspects of the disclosure.

As illustrated in FIG. 8, a UE may be configured with a first set of CSI reporting configurations for a first TRP (TRP A) and a second set of CSI reporting configurations for a second TRP (TRP B). In some cases, the UE may receive (via RRC signaling) a CSI-AperiodicTriggerStateList-TRPA that identifies the TRP A CSI reporting configurations and a CSI-AperiodicTriggerStateList-TRP B that identifies the TRP B CSI reporting configurations.

In some cases, TRP differentiation at the UE side may be based on control resource set (CORESET) or CORESET groups. CORESET groups may be defined by higher layer signaling of an index per CORESET which can be used to group the CORESETs. For example, for 2 CORESET groups, two indexes may be used (i.e. index=0 and index=1). Thus, a UE may monitor for transmissions in different CORESET groups and infer that transmissions sent in different CORESET groups come from different TRPs. There may be other ways in which the notion of different TRPs may be transparent to the UE.

Each TRP may be associated with a different control resource set (CORESET). The CORESET on which the UL scheduling grant is received may be used for the UE to identify the TRP that triggers the A-CSI/SP-CSI transmission.

Each of N1 CSI reporting configurations for TRP A may be associated with one or more (e.g., up to 3) of M1 CSI resource configurations for TRP A, while each of N2 CSI reporting configuration for TRP B may be associated with one or more (e.g., up to 3) of M2 CSI resource configurations for TRP B. Each CSI reporting configuration may indicate one or more of a CSI-RS resource, a CSI interference management (IM) resource, or a synchronization signal block (SSB) and may be associated with one or more (of k) BWPs.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into sub-bands. For example, a sub-band may cover 1.8 MHz (e.g., 6 RBs), and there may be 1, 2, 4, 8, or 16 sub-bands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system. For example, in some cases, processors such as those shown in FIG. 2 may be configured to perform operations 400 of FIG. 4 and/or operations 500 of FIG. 5.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 6-7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication by a user equipment (UE), comprising:
   obtaining information regarding a first set of channel state information (CSI) reporting configurations for a first transmitter receiver point (TRP) separate from a second set of CSI reporting configurations for a second TRP;
   receiving a first downlink control information (DCI) scheduling a CSI report on at least one physical uplink shared channel (PUSCH);
   generating at least one CSI report for the first TRP in accordance with one or more of the first set of CSI reporting configurations selected based, at least in part, on a control resource set (CORESET) on which the first DCI was received; and
   transmitting the at least one CSI report on the PUSCH.

2. The method of claim 1, wherein selecting the one or more of the first set of CSI reporting configurations based on the CORESET comprises:
   identifying the first a TRP based on the CORESET on which the first DCI was received; and
   selecting the one or more of the first set of CSI reporting configurations based on the identified first TRP.

3. The method of claim 1, wherein the information comprises:
   a first CSI trigger state list for the first TRP; and
   a second CSI trigger state list for the second TRP, wherein the first CSI trigger state list identifies the first set of CSI report configurations, and the second CSI trigger state list identifies the second set of CSI report configurations.

4. The method of claim 1, further comprising:
   receiving a second DCI, wherein:
     the UE is configured with a third set of CSI reporting configurations for a first service type and a fourth set of CSI reporting configurations for a second service type; and
     the second DCI is associated with the first service type; and
   generating a CSI report for the first service type in accordance with one of the third set of CSI report configurations, based, at least in part, on the second DCI.

5. The method of claim 4, further comprising:
   receiving a third DCI that is associated with the second service type; and
   generating a CSI report from the fourth set of CSI report configurations, based, at least in part, on the third DCI.

6. The method of claim 1, wherein:
   the UE is configured with a third set of CSI reporting configurations for a first service type and a fourth set of CSI reporting configurations for a second service type;
   the first service type has a first priority; and
   the second service type has a second priority, wherein the second priority is different from the first priority.

7. The method of claim 6, further comprising:
   receiving a second DCI scheduling a CSI report for the second service type on at least one PUSCH; and giving priority to the CSI report for the first service type over the CSI report for the second service type.

8. The method of claim 6, wherein:
the first service type comprises an ultra-reliable low latency communications (URLLC) service type;
the second service type comprises an enhanced mobile broadband (eMBB) service type;
the third set of CSI reporting configurations specifies a first type of codebook for URLLC CSI reporting; and
the fourth set of CSI reporting configurations specifies a second type of codebook for eMBB CSI reporting.

9. The method of claim 6, wherein:
the first service type comprises an ultra-reliable low latency communications (URLLC) service type;
the second service type comprises an enhanced mobile broadband (eMBB) service type;
the third set of CSI reporting configurations specifies a single part CSI reporting for URLLC; and
the fourth set of CSI reporting configurations specifies a two-part CSI reporting for eMBB.

10. The method of claim 6, wherein:
the first service type comprises an ultra-reliable low latency communications (URLLC) service type;
the second service type comprises an enhanced mobile broadband (eMBB) service type;
the third set of CSI reporting configurations specifies a first CQI table associated with first block error rate (BLER) targets for URLLC CSI reporting; and
the fourth set of CSI reporting configurations specifies second CQI table associated with second block error rate (BLER) targets for eMBB CSI reporting.

11. The method of claim 6, wherein:
the first service type comprises an ultra-reliable low latency communications (URLLC) service type;
the second service type comprises an enhanced mobile broadband (eMBB) service type; and
one or more of the third set of CSI reporting configurations specify at least one of:
one or more codebook subset restrictions that restrict at least one of beams or ranks that can be used for URLLC CSI reporting;
a serving cell index restriction, based on whether URLLC is supported in a given cell; or
a restriction sub-band size for sub-band based CSI reporting.

12. The method of claim 1, wherein the first DCI comprises a CSI request field that:
triggers an aperiodic CSI report according to the selected one or more of the first set of CSI reporting configurations; or activates semi-persistent CSI reporting according to the selected one or more of the first set of CSI reporting configurations.

13. The method of claim 1, wherein:
the first set of CSI reporting configurations for the first TRP and the second set of CSI reporting configurations for the second TRP are selected from different sets of CSI reporting configurations.

14. The method of claim 1, wherein:
the UE is configured with a third set of CSI reporting configurations for a first service type and a fourth set of CSI reporting configurations for a second service type; and
the third set of CSI reporting configurations for the first service type and the fourth set of CSI reporting configurations for the second service type are selected from a common set of CSI reporting configurations.

15. A method of wireless communication by a network entity, comprising:
configuring a user equipment (UE) with information regarding a first set of channel state information (CSI) reporting configurations for a first transmitter receiver point (TRP) separate from a second set of CSI reporting configurations for a second TRP;
sending the UE a first downlink control information (DCI) scheduling a CSI report on at least one physical uplink shared channel (PUSCH); and
receiving, from the UE, at least one CSI report generated in accordance with one or more of the first set of CSI reporting configurations selected based, at least in part, on a control resource set (CORESET) on which the first DCI was sent.

16. The method of claim 15, wherein the information comprises:
a first CSI trigger state list for the first TRP; and
a second CSI trigger state list for the second TRP, wherein the first CSI trigger state list identifies the first set of CSI report configurations, and the second CSI trigger state list identifies the second set of CSI report configurations.

17. The method of claim 15, further comprising:
sending a second DCI, wherein:
the UE is configured with a third set of CSI reporting configurations for a first service type and a fourth set of CSI reporting configurations for a second service type; and
the second DCI is associated with the first service type; and
receiving, from the UE, a CSI report for the first service type, generated in accordance with one of the third set of CSI report configurations, based, at least in part, on the second DCI.

18. The method of claim 17, further comprising:
sending the UE a third DCI that is associated with the second service type; and
receiving, from the UE, a CSI report generated from the second set of CSI report configurations, based, at least in part, on the third DCI.

19. The method of claim 15, wherein:
the UE is configured with a third set of CSI reporting configurations for a first service type and a fourth set of CSI reporting configurations for a second service type;
the first service type has a first priority; and
the second service type has a second priority, wherein the second priority is different from the first priority.

20. The method of claim 19, wherein:
the third set of CSI reporting configurations specifies a single part CSI reporting for URLLC; and
the fourth set of CSI reporting configurations specifies a two-part CSI reporting for eMBB.

21. The method of claim 20, wherein:
the third set of CSI reporting configurations specifies a first type of codebook for URLLC CSI reporting; and
the fourth set of CSI reporting configurations specifies a second type of codebook for eMBB CSI reporting.

22. The method of claim 20, wherein:
the third set of CSI reporting configurations specifies a first CQI table associated with first block error rate (BLER) targets for URLLC CSI reporting; and
the fourth set of CSI reporting configurations specifies second CQI table associated with second block error rate (BLER) targets for eMBB CSI reporting.

23. The method of claim 20, wherein one or more of the third set of CSI reporting configurations specify at least one of:
- one or more codebook subset restrictions that restrict at least one of beams or ranks that can be used for URLLC CSI reporting;
- a serving cell index restriction, based on whether URLLC is supported in a given cell; or
- a restriction sub-band size for sub-band based CSI reporting.

24. The method of claim 15, wherein the first DCI comprises a CSI request field that:
- triggers an aperiodic CSI report according to the selected one or more of the first set of CSI reporting configurations; or
- activates semi-persistent CSI reporting according to the selected one or more of the first set of CSI reporting configurations.

25. The method of claim 15, wherein:
the first set of CSI reporting configurations for the first TRP and the second set of CSI reporting configurations for the second TRP are selected from different sets of CSI reporting configurations.

26. The method of claim 15, wherein:
- the UE is configured with a third set of CSI reporting configurations for a first service type and a fourth set of CSI reporting configurations for a second service type; and
- the third set of CSI reporting configurations for the first service type and the fourth set of CSI reporting configurations for the second service type are selected from a common set of CSI reporting configurations.

27. An apparatus for wireless communication by a user equipment, comprising:
at least one processor and a memory configured to
- obtain information regarding a first set of channel state information (CSI) reporting configurations for a first transmitter receiver point (TRP) separate from a second set of CSI reporting configurations for a second TRP;
- receive a first downlink control information (DCI) scheduling a CSI report on at least one physical uplink shared channel (PUSCH);
- generate at least one CSI report for the type TRP in accordance with one or more of the first set of CSI reporting configurations selected based, at least in part, on a control resource set (CORESET) on which the first DCI was received; and
- transmit the at least one CSI report on the PUSCH.

28. An apparatus for wireless communication by a network entity, comprising:
at least one processor and a memory configured to
- configure a user equipment (UE) with information regarding a first set of channel state information (CSI) reporting configurations for a first transmitter receiver point (TRP) separate from a second set of CSI reporting configurations for a second TRP;
- send the UE a first downlink control information (DCI) scheduling a CSI report on at least one physical uplink shared channel (PUSCH); and
- receive, from the UE, at least one CSI report generated in accordance with one or more of the first set of CSI reporting configurations selected based, at least in part, on a control resource set (CORESET) on which the first DCI was sent.

* * * * *